(12) United States Patent
Lillibridge et al.

(10) Patent No.: US 8,959,089 B2
(45) Date of Patent: *Feb. 17, 2015

(54) DATA PROCESSING APPARATUS AND METHOD OF PROCESSING DATA

(75) Inventors: Mark David Lillibridge, Mountain View, CA (US); Vinay Deolalikar, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

This patent is subject to a terminal disclaimer.

(21) Appl. No.: 12/988,365

(22) PCT Filed: Apr. 25, 2008

(86) PCT No.: PCT/US2008/061576
§ 371 (c)(1),
(2), (4) Date: Oct. 18, 2010

(87) PCT Pub. No.: WO2009/131585
PCT Pub. Date: Oct. 29, 2009

(65) Prior Publication Data
US 2011/0040763 A1     Feb. 17, 2011

(51) Int. Cl.
*G06F 17/30* (2006.01)
*G06F 11/14* (2006.01)

(52) U.S. Cl.
CPC ................................. *G06F 11/1453* (2013.01)
USPC ........................................ 707/737; 707/741

(58) Field of Classification Search
CPC ................................................ G06F 17/30598
USPC ................................................. 707/737, 741
See application file for complete search history.

(56) References Cited

U.S. PATENT DOCUMENTS

| | | | |
|---|---|---|---|
| 5,369,778 | A | 11/1994 | San Soucie |
| 5,638,509 | A | 6/1997 | Dunphy |

(Continued)

FOREIGN PATENT DOCUMENTS

| | | |
|---|---|---|
| CN | 1692356 | 11/2005 |
| EP | 2038763 | 1/2008 |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002 (8 pages).

(Continued)

*Primary Examiner* — Apu Mofiz
*Assistant Examiner* — Chelcie Daye
(74) *Attorney, Agent, or Firm* — Trop, Pruner & Hu, P.C.

(57) ABSTRACT

One embodiment is a data processing apparatus that has a chunk store containing specimen data chunks, a manifest store containing a plurality of manifests, each of which represents at least a part of previously processed data and includes at least one reference to at least one of the specimen data chunks, and a sparse chunk index containing information on only some specimen data chunks. Input data is processed into a plurality of input data segments. Each manifest of the first set has at least one reference to one of said specimen data chunks that corresponds to one of the input data chunks of a first input data segment. Specimen data chunks corresponding to other input data chunks of the first input data segment are identified by using the identified first set of manifests and at least one manifest identified when processing previous data.

20 Claims, 6 Drawing Sheets

(56) References Cited

U.S. PATENT DOCUMENTS

| | | | |
|---|---|---|---|
| 5,990,810 A | 11/1999 | Williams | |
| 6,122,626 A * | 9/2000 | Brandsma | 707/1 |
| 6,396,838 B1 | 5/2002 | Palnati | |
| 6,513,050 B1 | 1/2003 | Williams | |
| 6,542,975 B1 | 4/2003 | Evers | |
| 6,564,228 B1 | 5/2003 | O'Connor | |
| 6,795,963 B1 | 9/2004 | Andersen | |
| 6,839,680 B1 | 1/2005 | Liu | |
| 6,938,005 B2 * | 8/2005 | Iverson et al. | 705/26.41 |
| 6,961,009 B2 | 11/2005 | McCanne | |
| 7,028,158 B1 | 4/2006 | Beatty et al. | |
| 7,065,619 B1 | 6/2006 | Zhu | |
| 7,082,548 B2 | 7/2006 | Nakano | |
| 7,269,689 B2 | 9/2007 | Eshghi | |
| 7,472,242 B1 | 12/2008 | Deshmukh | |
| 7,584,338 B1 | 9/2009 | Bricker et al. | |
| 7,788,233 B1 | 8/2010 | Iyer et al. | |
| 7,913,056 B2 | 3/2011 | Brown et al. | |
| 7,917,722 B2 | 3/2011 | Yamamoto et al. | |
| 7,925,683 B2 | 4/2011 | Jain et al. | |
| 7,979,670 B2 | 7/2011 | Saliba et al. | |
| 8,099,573 B2 | 1/2012 | Camble | |
| 8,150,851 B2 | 4/2012 | Jones | |
| 8,156,306 B1 | 4/2012 | Raizen et al. | |
| 8,161,255 B2 | 4/2012 | Anglin et al. | |
| 8,332,404 B2 | 12/2012 | Camble et al. | |
| 2001/0001870 A1 | 5/2001 | Ofek | |
| 2001/0010070 A1 | 7/2001 | Crockett | |
| 2001/0011266 A1 * | 8/2001 | Baba | 707/1 |
| 2002/0156912 A1 * | 10/2002 | Hurst et al. | 709/236 |
| 2002/0169934 A1 | 11/2002 | Krapp | |
| 2003/0065898 A1 | 4/2003 | Flamma et al. | |
| 2003/0101449 A1 | 5/2003 | Bentolila | |
| 2003/0140051 A1 | 7/2003 | Fujiwara | |
| 2004/0078293 A1 | 4/2004 | Iverson | |
| 2004/0162953 A1 | 8/2004 | Yoshida | |
| 2005/0091234 A1 | 4/2005 | Hsu | |
| 2005/0108433 A1 | 5/2005 | Wu | |
| 2005/0131939 A1 | 6/2005 | Douglis | |
| 2006/0047855 A1 | 3/2006 | Gurevich et al. | |
| 2006/0059171 A1 | 3/2006 | Borthakur | |
| 2006/0059173 A1 | 3/2006 | Hirsch | |
| 2006/0059207 A1 | 3/2006 | Hirsch | |
| 2006/0116990 A1 | 6/2006 | Margolus et al. | |
| 2006/0282457 A1 | 12/2006 | Williams | |
| 2006/0293859 A1 | 12/2006 | Pipke et al. | |
| 2007/0124415 A1 | 5/2007 | Lev-Ran | |
| 2007/0208788 A1 | 9/2007 | Chakravarty et al. | |
| 2007/0220197 A1 | 9/2007 | Lasser | |
| 2007/0250519 A1 | 10/2007 | Fineberg | |
| 2007/0250670 A1 | 10/2007 | Fineberg et al. | |
| 2007/0250674 A1 | 10/2007 | Fineberg | |
| 2007/0255758 A1 | 11/2007 | Zheng | |
| 2008/0052468 A1 | 2/2008 | Speirs | |
| 2008/0126176 A1 | 5/2008 | Iguchi | |
| 2008/0133561 A1 | 6/2008 | Dubnicki | |
| 2008/0244210 A1 | 10/2008 | Vingralek | |
| 2008/0256326 A1 | 10/2008 | Patterson | |
| 2008/0270461 A1 | 10/2008 | Gordon et al. | |
| 2008/0294660 A1 | 11/2008 | Patterson et al. | |
| 2008/0294696 A1 | 11/2008 | Frandzel | |
| 2008/0301111 A1 | 12/2008 | Statchuk | |
| 2008/0301256 A1 | 12/2008 | McWilliams et al. | |
| 2009/0019246 A1 | 1/2009 | Murase | |
| 2009/0037499 A1 | 2/2009 | Muthulingam | |
| 2009/0077342 A1 | 3/2009 | Chen | |
| 2009/0112945 A1 | 4/2009 | Camble | |
| 2009/0112946 A1 | 4/2009 | Jones | |
| 2009/0113167 A1 | 4/2009 | Camble | |
| 2009/0234821 A1 | 9/2009 | Hirsch | |
| 2009/0234855 A1 * | 9/2009 | Hirsch et al. | 707/6 |
| 2010/0174881 A1 | 7/2010 | Anglin et al. | |
| 2010/0198792 A1 | 8/2010 | Camble | |
| 2010/0198832 A1 * | 8/2010 | Jones | 707/741 |
| 2010/0205163 A1 | 8/2010 | Eshghi | |
| 2010/0235372 A1 | 9/2010 | Camble | |
| 2010/0235485 A1 | 9/2010 | Lillibridge | |
| 2010/0246709 A1 | 9/2010 | Lillibridge | |
| 2010/0280997 A1 | 11/2010 | Lillibridge | |
| 2010/0281077 A1 | 11/2010 | Lillibridge | |
| 2010/0281230 A1 | 11/2010 | Rabii et al. | |
| 2011/0173430 A1 | 7/2011 | Kacin | |
| 2011/0252217 A1 | 10/2011 | Lillibridge | |

FOREIGN PATENT DOCUMENTS

| | | |
|---|---|---|
| EP | 2012235 | 1/2009 |
| WO | 2006030326 A1 | 3/2006 |
| WO | WO-2006032049 | 3/2006 |
| WO | 2006094365 A1 | 9/2006 |
| WO | 2006094366 A1 | 9/2006 |
| WO | 2006094367 A1 | 9/2006 |
| WO | 2007127248 A2 | 11/2007 |
| WO | 2009054828 A1 | 4/2009 |
| WO | WO-2009054827 | 4/2009 |
| WO | 2009131585 A1 | 10/2009 |

OTHER PUBLICATIONS

Baoyao, Zhou; "'Intelligent Web Usage Mining'" Nanyang Technological University, Division of Information Systems, School of Computer Engineering, 2004 (94 pages).

Baynote Inc.: The Collective Intelligence Platform, Online, http://www.baynote.com/technology/platform/ 2010 (1 page).

Hottolink Inc.; "Recognize" Online, http://www.hottolink.co.jp/english/reconize.html, 2009 (2 pages).

Andrejko et al.: User Characteristics Acquisition from Logs with Semantics, Slovak University of Technology in Bratislava, 2007 (8 pages).

Hongjun Lu et al: Extending a Web Browser with Client-Side Mining, Hong Kong University of Science and Technology Department of Computer Science, Clear Water Bay, Kowloon, Hong Kong, China, 2003 (12 pages).

Shankar et al.; "'Personalized Web Search Based on Client Side Ontology'", CS 498: B.Tech Project,10. IIT Kanpur, India 2010 (9 pages).

Sendhikumar et al.; "Personalized ontology for web search personalization" Anna University, Chennai, India , 2008 (7 pages).

Shahabi et al.; "Yoda an Accurate and Scalable Web based Recommendation System?" University of SouthernCalifornia, Los Angeles, Sep. 2001 (14 pages).

Why WUBAT? Website User Behavior &Analysis Tool, Wubat, Online, http://www.wubat.com/ dated on or before Oct. 12, 2010 (3 pages).

Claypool et al.; "Implicit Interest Indicators", Worcester Polytechnic Institute, Worcester, Computer Science Department Worcester Polytechnic Institute Worcester, MA 01609, USA., 2001 (8 pages).

Shahabi et al.; A Framework for Efficient and Anonymous Web Usage Mining Based on Client-Side Tracking, University of Southern California, Los Angeles, 2002 (48 pages).

Clattertrap; Online http://www.clattertrap.com; Jul. 20, 2010 (1 page).

HSNW: SRI defense technology spawns civilian application: published Jun. 29, 2010 (2 pages).

Anthony Ha: Facebook investor backs Chattertrap, a personal assistant for content, Jun. 28, 2010 (6 pages).

Muthitacharoen Athicha, et al., "A Low-Bandwidth Network File System," Proceedings of the 18th ACM Symposium on Operating Systems Principles (SOSP '01), Oct. 2001.

L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.

You L. L. et al., "Deep Store an Archival Storage System Architecture" Data Engineering, 2005. ICDE 2005. Proceedings. 21st. intl Conf on Tokyo, Japan, Apr. 5-8, 2005, p. 12.

Brin, Sergey, et al., "Copy Detection Mechanisms for Digital Documents", Department of Computer Science, Stanford University, Oct. 31, 1994, p. 1-12.

(56) References Cited

OTHER PUBLICATIONS

Manber, Udi, "Finding Similar Files in a Large File System," Department of Computer Science, University of Arizona, TR 93-33, Oct. 1993, (11 pages).
Rabin, M.O., "Fingerprinting by Random Polynomials," Technical Report, Center for Research in Computing Technology, Harvard University, 1981, Report TR-15-81 (14 pages).
K. Eshghi et al., "Jumbo Store: Providing Efficient Incremental Upload and Versioning for a Utility Rendering Service", 5th USENIX Conference on File and USENIX Association Storage Technologies, Feb. 13-16, 2007, pp. 123-138.
U.S. Appl. No. 12/671,346, Non-Final Rejection dated Mar. 29, 2012, pp. 1-24 and attachments.
U.S. Appl. No. 12/257,659, Non-Final Rejection dated Apr. 28, 2011, pp. 1-23 and attachment.
U.S. Appl. No. 12/257,659, Final Rejection dated Nov. 14, 2011, pp. 1-32 and attachments.
U.S. Appl. No. 12/257,659, Notice of Allowance dated Aug. 15, 2012 (15 pages).
U.S. Appl. No. 12/256,329, Non-Final Rejection dated May 25, 2011, pp. 1-17 and attachments.
U.S. Appl. No. 12/256,329, Notice of Allowance dated Sep. 14, 2011, pp. 1-6 and attachments.
United Kingdom Intellectual Property Office, GB Application No. GB1015473.0, Examination Report dated Mar. 6, 2012 (3 pages).
United Kingdom Intellectual Property Office, GB Application No. GB1015473.0, Examination Report dated May 31, 2012 (3 pages).
Bigelow, Stephen, Data Deduplication Explained. 2007 Storage Magazine, http://cdn.ttgtmedia.com/searchStorage/downloads/StorageExtra_DataDupe.pdf, 4 pps.
ComputerWeekly.com, How data deduplication works, TechTarget, Nov. 6, 2007, http://www.computerweekly.com/feature/How-data-deduplication-works, 2 pps.
Freeman, Larry, Looking Beyond the Hype: Evaluating Data Deduplication Solutions, Netapp White Paper, WP-7028-0907, Sep. 2007, http://storage-brain.com/wp-content/uploads/papers/Evaluating_Data_Deduplication_Solutions.pdf, 12 pps.
Llewellyn, Mark, COP 3530C—Computer Science III, Summer 2002, http://www.cs.ucf.edu/courses/cop3530-su02, 24 pps.
Manegold, Stefan et al, Databases Techniek, 2005, http://homepages.cwi.nl/~manegold/teaching/DBtech, Archiviert in http://www.archive.org am Sep. 16, 2005, 20 pps.
U.S. Appl. No. 12/671,346, Examiner's Answer dated May 9, 2013, pp. 1-14 and attachments.
U.S. Appl. No. 12/671,346, Final Office Action dated Sep. 10, 2012, pp. 1-23 and attachments.
Zaiane, Osmar R et al, Database Systems and Structures, CMPT 354, Summer 1998, http://www.cs.sfu.ca/CourseCentral/354/zaiane/, 18 pps.
Zhu, Benjamin et al, Avoiding the disk bottleneck in the data domain deduplication file system, Proceedings of the 6th USENIX Conference on File and Storage Technologies, Feb. 29, 2008, http://usenix.org/events/fast08/tech/full_papers/zhu/zhu.pdf, pp. 269-282.
August, David. Lecture, COS 217, Optimizing Malloc and Free, http://gee.cs.oswego.edu/dl/html/malloc.html, Nov. 2007, 8 pps.
Doug Lea, A Memory Allocator, Apr. 2000 (6 pages).
Jula, Alin et al., How to Focus on Memory Allocation Strategies, Jun. 18, 2007, 29 pps.
Korean Intellectual Property Office, Notification of Transmittal of the International Search Report and the Written Opinion of the International Searching Authority, or the Declaration for International Appl. No. PCT/US2008/061576 dated Jan. 23, 2009 (13 pages).
Litwin, Witold, Linear Hashing: A new tool for file and table addressing, I.N.R.I.A., published by IEEE 1980; pp. 212-223.

* cited by examiner

DATA PROCESSING APPARATUS AND METHOD OF PROCESSING DATA

FIELD OF THE INVENTION

The invention is generally directed to data storage and, more particularly, to a data processing apparatus for storing data.

BACKGROUND OF THE INVENTION

Data held on a primary data storage medium may be backed-up to secondary data storage medium. The secondary data storage medium may be in a different location to the primary data storage medium. Should there be at least a partial loss of the data on the primary data storage medium, data may be recovered from the secondary data storage medium. The secondary data storage medium may contain a history of the data stored on the primary data storage medium over a period of time. On request by a user, the secondary data storage medium may provide the user with the data that was stored on the primary data storage medium at a specified point in time.

Data back-up procedures may be carried out weekly, daily, hourly, or at other intervals. Data may be backed-up incrementally, where only the changes made to the data on the primary data medium since the last back-up are transferred to the secondary data storage medium. A full back-up may also be performed, where the entire contents of the primary data medium are copied to the secondary data medium. Many other back-up strategies exist.

When backing-up data, a particular part of the data being backed-up may have previously been stored to the primary data storage medium, which may especially be the case when full back-ups are carried out. Storing the same data numerous times represents an inefficient use of a data storage medium.

SUMMARY OF THE INVENTION

Accordingly, the present invention provides data processing apparatus comprising:
a chunk store containing specimen data chunks,
a manifest store containing a plurality of manifests, each of which represents at least a part of previously processed data and comprises at least one reference to at least one of said specimen data chunks,
a sparse chunk index containing information on only some specimen data chunks,
the processing apparatus being operable to:
process input data into a plurality of input data segments, each composed of input data chunks;
identify a first set of manifests, where each manifest of the first set has at least one reference to one of said specimen data chunks that corresponds to one of the input data chunks of a first input data segment, and on which there is information contained in the sparse chunk index;
identify specimen data chunks corresponding to other input data chunks of the first input data segment by using the identified first set of manifests and at least one manifest identified when processing previous data.

In one embodiment the sparse chunk index contains information on specimen data chunks having a predetermined characteristic.

In one embodiment, the data processing apparatus is operable to compare the input data chunks of the first input data segment with the specimen data chunks referenced by at least one of the identified first set of manifests or the at least one manifest identified when processing previous data, to identify specimen data chunks corresponding to input data chunks of the first input data segment.

In one embodiment, the data processing apparatus is operable to generate a chunk identifier for at least some of the input data chunks and at least some of the specimen data chunks; and to compare the generated chunk identifiers of the input data chunks with the generated chunk identifiers of the referenced specimen data chunks.

In one embodiment, the data processing apparatus further comprises a cache, the apparatus being operable to store at least one of said identified first set of manifests in the cache.

In one embodiment, the cache is operable to store manifests identified in sequentially processing a plurality of input data segments.

In one embodiment, the data processing apparatus is operable to prioritise the said identified first set of manifests and said at least one manifest identified when processing previous data.

In one embodiment, the prioritization criteria are based at least in part on the number of references each manifest contains to specimen data chunks corresponding to input data chunks of the first input data segment and on which there is information contained in the sparse chunk index.

In one embodiment, the criteria when prioritising the at least one manifest identified when processing previous data, are based at least in part on a prioritisation of the at least one manifest when processing that previous data.

In one embodiment, the prioritization criteria are based at least in part on when each manifest was added to the manifest store.

In one embodiment, the prioritization criteria are based at least in part on whether each manifest is currently held in the cache.

In one embodiment, the data processing apparatus is operable to select at least one of the prioritised manifests to identify specimen data chunks corresponding to said other input data chunks of the first input data segment.

In one embodiment, the data processing apparatus is operable to re-prioritise the identified first set of manifests and the at least one manifest identified when processing previous data during subsequent operation.

In one embodiment, the data processing apparatus is operable to process each selected prioritised manifest, in descending order of its prioritisation, until a predetermined condition has been met.

In one embodiment, the data processing apparatus is operable to process each selected prioritised manifest, in descending order of its prioritisation, until a predetermined condition of the manifest currently being processed has been met.

In one embodiment, the data processing apparatus is operable to store an input data chunk in the chunk store as a specimen data chunk, should the apparatus fail to determine that a specimen data chunk corresponding to that input data chunk exists in the chunk store.

The present invention further provides data processing apparatus comprising:
a chunk store containing specimen data chunks,
a manifest store containing a plurality of manifests, each of which represents at least a part of previously processed data and comprises at least one reference to at least one of said specimen data chunks,
a sparse chunk index containing information on only some specimen data chunks,
the processing apparatus being operable to:
process input data into a plurality of input data segments, each composed of input data chunks;

identify a first set of manifests, where each manifest of the first set has references to specimen data chunks which correspond to input data chunks of a first input data segment and on which there is information contained in the sparse chunk index;

retrieve manifests having references to specimen data chunks which correspond to at least one input data chunk of previously processed data, use the identified and retrieved manifests to identify specimen data chunks corresponding to other input data chunks of the first input data segment In one embodiment, the at least one input data chunk of previously processed data is a predetermined portion of input data chunks of an input data segment of previously processed data.

In one embodiment, the input data segment of previously processed data immediately proceeds said first input data segment in the input data.

In one embodiment, the predetermined portion of an an input data segment of previously processed data comprises the input data chunks immediately preceding the first input data segment in the input data The present invention further provides a data processor, operable to:

process input data into input data chunks, the input data chunks being arranged into input data segments;

for a given input data segment, select at least some of the input data chunks of the input data segment having a predetermined characteristic, compile a list of candidate manifests from a manifest store, the list comprising:

at least one manifest having a reference to a specimen data chunk corresponding to at least one of the selected input data chunks; and at least one manifest identified in processing at least one other segment of input data; and prioritise and process the candidate manifests to identify specimen data chunks corresponding to other input data chunks of the input data segment being processed.

The present invention further provides a method of processing data, using:

a chunk store containing specimen data chunks, a manifest store containing a plurality of manifests, each of which represents at least a part of previously processed data and comprises at least one reference to at least one of said specimen data chunks; and a sparse chunk index containing information on only some specimen data chunks, the method comprising:

processing input data into a plurality of input data segments, each composed of input data chunks;

identifying a first set of manifests, where each manifest of the first set has at least one reference to one of said specimen data chunks that corresponds to one of the input data chunks of a first input data segment and on which there is information contained in the sparse chunk index; and using the identified first set of manifests and at least one manifest identified when processing previous data to identify specimen data chunks corresponding to other input data chunks of the first input data segment In one embodiment, the method comprises:

comparing the input data chunks of the first input data segment with the specimen data chunks referenced by at least one of the identified first set of manifests or at least one manifest identified when processing previous data.

In one embodiment, the method comprises:

prioritising the said identified first set of manifests and said at least one manifest identified when processing previous data, based on predetermined criteria.

The present invention further provides data processing apparatus comprising:

a chunk store containing specimen data chunks, a manifest store containing a plurality of manifests, each of which represents at least a part of previously processed data and comprises at least one reference to at least one of said specimen data chunks, a sparse chunk index containing information on only some specimen data chunks, the processing apparatus being operable to:

for a first input data segment, identify manifests having at least one reference to one of said specimen data chunks that corresponds to one of the input data chunks of the first input data segment, and on which there is information contained in the sparse chunk index;

use at least one of said identified manifests in processing a second input data segment, to identify specimen data chunks corresponding to input data chunks of the second input data segment.

BRIEF DESCRIPTION OF THE DRAWINGS

Embodiments of the invention will now be described, by way of example only, with reference to the accompanying drawings, in which.

DETAILED DESCRIPTION

Figure 1:
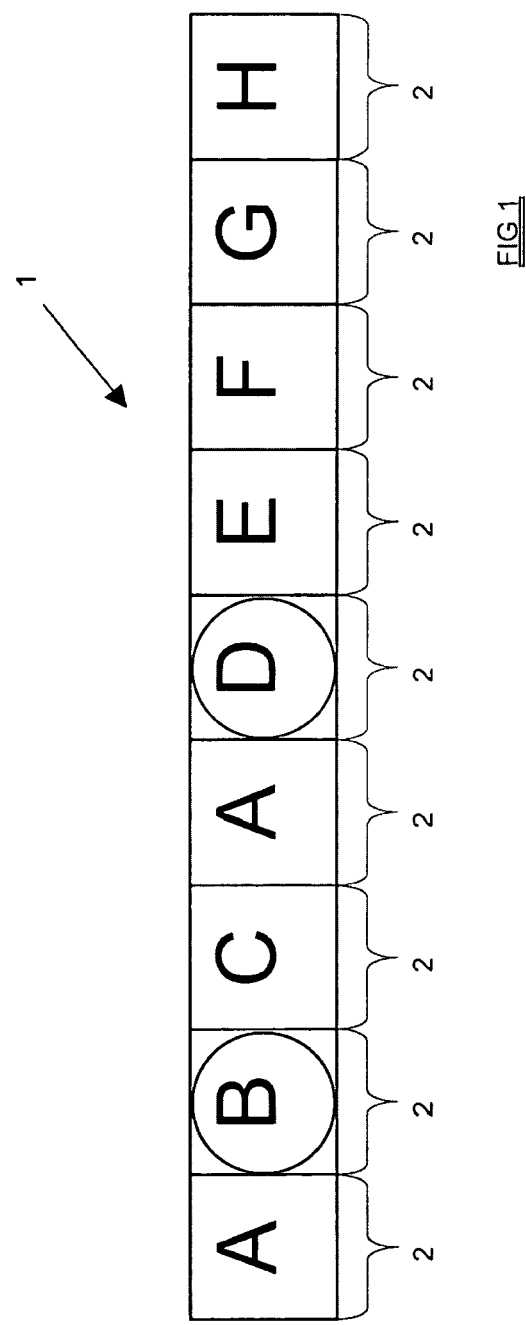
FIG. 1 shows a schematic representation of a data segment.

FIG. 1 shows a schematic representation of a data segment 1. A data segment 1 may be shorter or longer than that shown in FIG. 1. A data segment 1 comprises an amount of data, which may be in the order of 10 bytes, 1000 bytes, 10 KB or many megabytes or terabytes. A data segment may represent at least a part of the data for a given back-up operation. A data segment may be one of many in a data set.

A back-up data set may comprise a continuous data stream or a discontinuous data stream. Whichever, the data set may contain many distinct, individual files or parts of files. The data set may not be partitioned into the individual files it contains. The data set may contain embedded information, comprising references to the boundaries of the individual files contained in the data set. The data set may then more easily be dissected into its constituent components. The size of the embedded information may represent a significant portion of the total data. Backing-up data with embedded file information increases the required capacity of the data storage medium.

Data processing apparatus embodying the present invention is operable to process input data into one or more input data chunks. An input data set may be divided into a plurality of input data segments as above. The segments are each divided into a plurality of input data chunks. Each input data chunk may represent an individual file, a part of an individual file, a group of individual files within the input data set, or several individual files plus parts of several others. The data set may be processed into input data chunks based on properties of the input data as a whole, with little or no regard to the individual files contained therein. The boundaries of data chunks may or may not be coterminous with file boundaries. The data chunks may be identical or varying in size. Similarly, the data set may be processed into segments based on properties of the input data set as a whole or on the properties and/or number of the input data chunks. The segments may also be identical or varying in size. The data set may first be segmented before each segment is then processed into data chunks, or vice versa.

FIG. 1 illustrates a schematic representation of an input data segment 1 processed into data chunks 2. For convenience, each unique input data chunk is labelled in FIG. 1 from A-H. For the purposes of this application, when determining whether a chunk is unique we consider only its contents (i.e., the byte sequence in the data segment 1 it was created from), not its position or location in an input data segment or data set. Note that for this example the first and fourth chunks in the data segment 1 have the same content and are thus assigned the same label. Duplicated data in the data segment 1 may give rise to repeated input chunks 2. The input data segment 1 may be divided into more or different input data chunks 2 than those shown in FIG. 1. An input data segment 1 may be many terabytes in size, and be processed into billions of input data chunks. There are specific schemes available to the skilled person to determine how the input data segment 1 is processed into input data chunks 2 and which information each input data chunk 2 contains.

Figure 2:
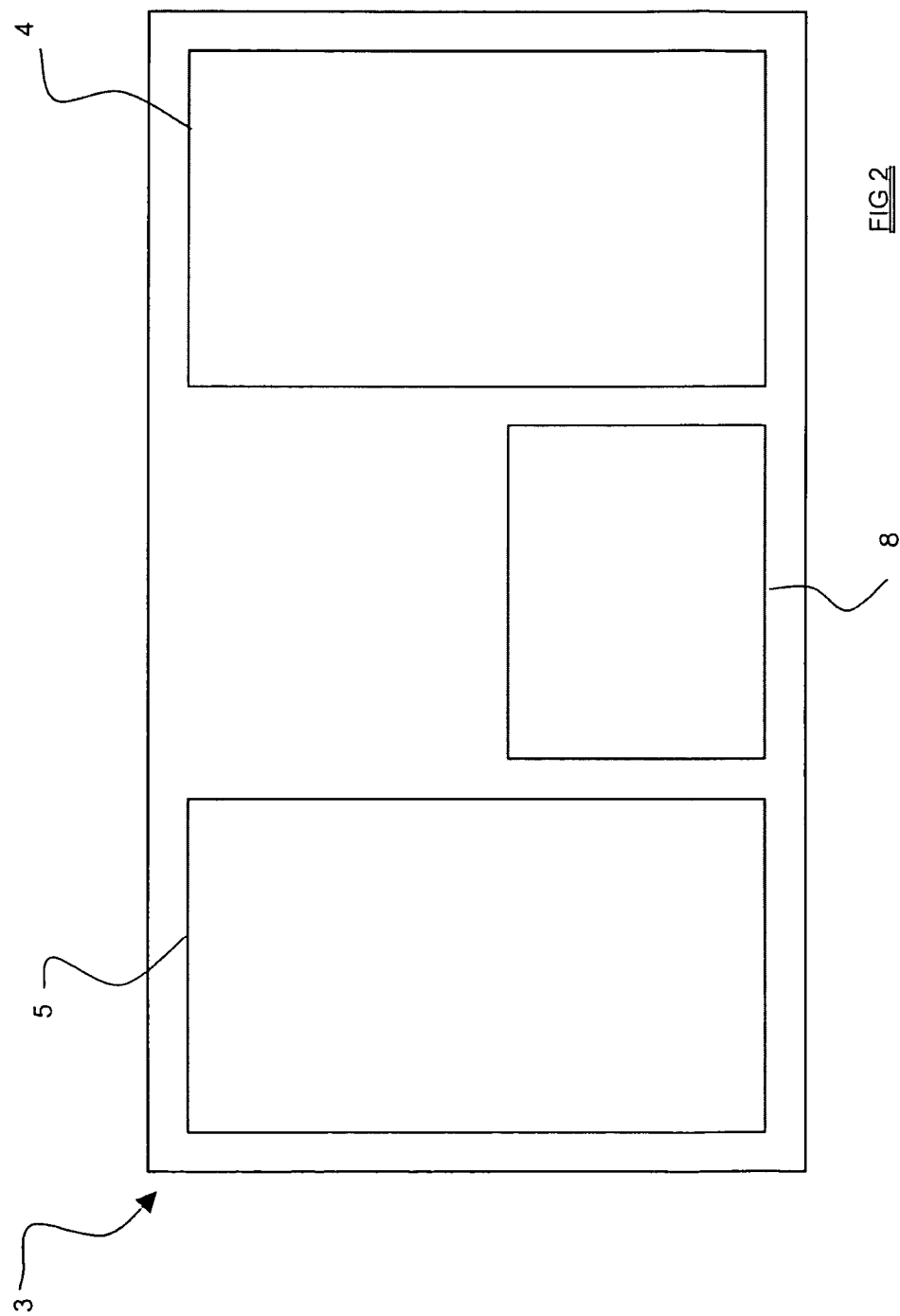
FIG. 2 shows a schematic representation of data processing apparatus embodying the present invention.

FIG. 2 shows data processing apparatus 3 embodying the present invention. The data processing apparatus 3 comprises a chunk store 4, a manifest store 5 and sparse chunk index 8. The manifest store 5 may be discrete from, and separate to, the chunk store 4 but both stores 4, 5 may reside on a common tangible data storage medium or memory device. In the example shown in FIG. 2, the chunk store 4, manifest store 5 and sparse chunk index 8 do not yet contain any data or information. How the data and information are populated in each of the chunk store 4, manifest store 5 and sparse chunk index 8 will now be described.

Figure 3:
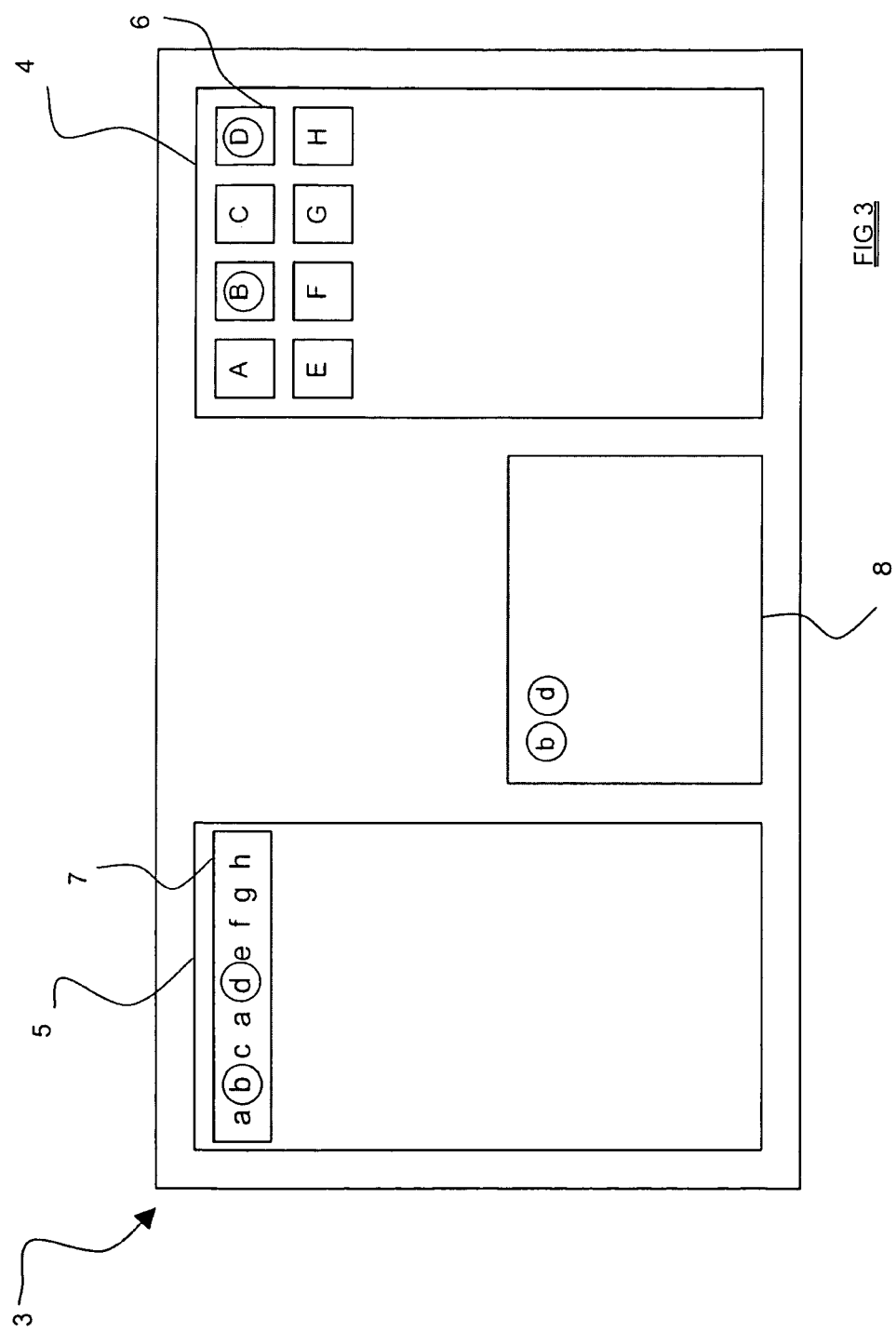
FIG. 3 shows a schematic representation of the data processing apparatus of FIG. 2, in use.

As an input data segment 1 is processed by data processing apparatus 3 embodying the present invention, each input data chunk 2 is stored to the chunk store 4 as a specimen data chunk 6 if the data processing apparatus 3 determines that a corresponding specimen data chunk 6 is not already present. FIG. 3 shows a schematic representation of the data processing apparatus 3 after having processed the input data segment of FIG. 1. It will be appreciated, in this example, that since the input data segment 1 is the first to be processed, all the unique input data chunks will be added to the chunk store 4 as specimen data chunks 6 (i.e. one of each of B, C, D, E, F, G and H but only one of the two occurrences of input data chunk A). However, in subsequent operations, it may be determined that an input data chunk is identical to a specimen data chunk 6 already stored in the chunk store 4; in which case no new additions to the chunk store 4 may be made. This is the principle of de-duplication.

A specimen data chunk 6 may be a carbon copy of an input data chunk 2. Alternatively, a specimen data chunk 6 may be a transformed copy of the corresponding input data chunk 2; for example, it may be an encrypted and/or compressed version of input data chunk 2 or have additional headers or metadata added. An input data chunk 2 and a specimen data chunk 6 may be considered to correspond if they contain the same contents. (The contents of an encrypted chunk are the corresponding unencrypted data.)

Note that although there are two input data chunks with contents A (the first and fourth), only one specimen data chunk 6 with contents A is shown as stored to chunk store 4 in FIG. 3. This is because we have assumed for this example that the data processing apparatus determines when it reaches the fourth chunk of input data segment 1 that it already has a corresponding specimen data chunk 6 in the chunk store 4 (added when the first chunk of input data segment 1 was processed). The determining procedure may occasionally make mistakes, determining that a chunk is not present when it actually is, leading to some specimen data chunks 6 being added to the chunk store 4 multiple times. Occasional duplication may be permitted. The chunk store 4 may store a plurality of specimen data chunks 6.

In one embodiment, both the chunk store 4 and manifest store 5 are stored in high latency, non-volatile, storage, such as disk. The sparse chunk index 8 may be stored on low latency, volatile, storage, such as RAM.

As an input data chunk 2 is processed, a manifest 7 is compiled. A manifest 7 is a representation of a data segment 1. The manifest 7 comprises references to specimen data chunks 6 in the chunk store 4 which correspond to the input data chunks 2 comprising the input data segment 1. So, the references of the manifest 7 may be seen as metadata to specimen data chunks 6. If the references to specimen data chunks 6 of a given manifest 7 are smaller in size than the specimen data chunks 6 referred to by the manifest 7, then it will be appreciated that a manifest 7 may be smaller in size than the input data segment 1 it represents. As more and more manifests are added to the manifest store 5, which manifests reference specimen data chunks already stored in the chunk store 4, the total combined size of the manifests and specimen data chunks may be smaller than the total combined size of the data segments the manifests represent; because duplicated input chunks may be stored only once each.

When an input data segment 1 has been processed into input data chunks 2 and a manifest 7 compiled, representing the input data segment 1, the manifest 7 is stored in the manifest store 5, as shown schematically in FIG. 3. Here we represent a reference to a specimen data chunk 6 with content X (there will usually only be one) using the corresponding lowercase letter x. The circles surrounding the letters are explained below.

If a user of data processing apparatus 3 embodying the present invention wishes to recover the data of a given input data segment 1—which may relate to a back-up made at a particular point in time—the apparatus will retrieve the corresponding manifest 7 from the manifest store 5. Each reference in the manifest 7 to specimen data chunks 6 in the chunk store 4 is then used to reconstruct the original data segment 1.

Populating the Sparse Chunk Index: Chunk Identifiers

As each input data chunk 2 is processed, the sparse chunk index 8 may be populated with information on only some of the specimen data chunks 6 that correspond to input data chunks 2. In one embodiment, the 'some' specimen data chunks may be chosen according to whether they have a predetermined characteristic. For a given number of specimen data chunks in the chunk store, there may be information in the sparse chunk index in relation to only a few, having the predetermined characteristic. In another embodiment, if none of these specimen data chunks 6 have the predetermined characteristic, no information will be added to the sparse chunk index 8. The 'sparsity' of the sparse chunk index 8 arises as a result of the index containing information on only some specimen data chunks 6 (in one embodiment, those having the predetermined characteristic) and not containing information on other specimen data chunks 6 (in one embodiment, those not having the predetermined characteristic). For a given number of specimen data chunks 6 stored in the chunk store 4, there will thus usually be a smaller number of specimen data chunks 6 about which the sparse chunk index 8 contains information.

In one embodiment, data processing apparatus embodying the present invention is operable to generate a chunk identifier of an input data chunk. A chunk identifier may be a digital fingerprint of the data chunk to which it relates. The chunk identifier may be a unique chunk identifier, being unique for a particular data chunk. The algorithm for generating chunk identifiers may be selected so as to be capable of generating unique chunk identifiers for a predetermined number of data chunks. In one embodiment, the chunk identifier is generated using the SHA1 hashing algorithm. Other hashing algorithms may be used, such as SHA2 or MDA5. In one embodiment, the hashing algorithm is selected and configured such that it is substantially computationally infeasible to find two different data chunks that would produce the same chunk identifier. Thus, given the number of specimen data chunks 6 that it may be possible to add to the chunk store 4 in practice due to chunk store 4 size limitations, it may be extremely unlikely that two of the added chunks 6 may share the same chunk identifier.

In one embodiment, the chunk identifier of an input data chunk is the same as the chunk identifier of the corresponding specimen data chunk 6. This may be achieved by having the chunk identifier depend only on the given chunk's contents. In one embodiment, the sparse chunk index 8 contains information on only the specimen data chunks 6 having a chunk identifier with a predetermined characteristic. In one example, the predetermined characteristic may be that N adjacent bits of the chunk identifier are of a predetermined bit value.

In one embodiment, the algorithm for generating chunk identifiers is chosen so as to generate a unique chunk identifier for every possible specimen data chunk likely to be added to the chunk store 4. Thus, a 4-bit chunk identifier, having only 16 possible values, should not be chosen where more than 16 unique specimen data chunks are likely to be added to the chunk store 4. Otherwise, two different specimen data chunks may be assigned the same chunk identifier. In one embodiment, the number of possible chunk identifier values is much larger than the likely number of unique specimen data chunks to be stored in the chunk store 4. In this embodiment, the risk of a collision (where the same chunk identifier is generated from two different specimen data chunks) may be reduced.

The above embodiment makes a selection of the specimen data chunks 6 based on a property of their chunk identifiers and not directly on the specimen data chunks 6 themselves. In an embodiment where chunk identifiers depend only on the contents of the given chunk, this means that there is no regard given to the location of the specimen data chunk 6 in the chunk store 4, or the order in which the specimen data chunks 6 were added to the chunk store. There is thus repeatability of whether a given input data chunk will have the predetermined characteristic, regardless of where in an input data set or segment it may appear.

In other embodiments, the predetermined characteristic may be based on the order in which the input data chunks are processed. For example, information relating to every $n^{th}$ input data chunk processed may be added to the sparse chunk index; or rather, information relating to the specimen data chunk which corresponds to the $n^{th}$ input data chunk will be added.

In another embodiment, not all the input data chunks having the predetermined characteristic will have information added to the sparse index 8. Information relating only to some of those input data chunks having a predetermined characteristic may be added to the sparse chunk index 8, based on predetermined selection criterion.

In the example input data segment 1 shown in FIG. 1, both input data chunks B and D have the predetermined characteristic, denoted by a circle.

Following the processing of the input data chunks 2 of input data segment 1, a number of specimen data chunks have been added to the chunk store 4 (see FIG. 3). As noted above, in one embodiment, there may only be one occurrence of each unique specimen data chunk 6 in the chunk store 4. In the case of input data set 1, these are chunks A to H.

In the figures, we denote when a chunk has a predetermined characteristic with a circle. Accordingly, in FIG. 1, two of the input data chunks 2 (B and D) have a predetermined characteristic. Thus, in one embodiment, information relating to the specimen data chunks 6 stored in the chunk store 4 which correspond to the input data chunks having a predetermined characteristic is added to the sparse chunk index 8. Accordingly, as shown in FIG. 3, there are entries made in the sparse chunk index 8 for specimen data chunks B and D—the entries are indicated with lowercase reference numerals in FIG. 3. As noted above, the circle around the references means that the specimen data chunk has a predetermined characteristic.

In another embodiment, information relating only to one of specimen data chunks B and D may be added to the sparse index 8, based on predetermined selection criteria.

Against each entry in the sparse chunk index 8 for a particular specimen data chunk, there may be stored a list of all of the manifests which reference that specimen data chunk. In this example, because the manifest store chunk index and chunk store are being populated for the first time, each of the entries b and d in the sparse index chunk index 8 will have a single reference to the manifest 7 in the manifest store 5. In other words, against the entry for specimen data chunk b in the sparse chunk index 8, there will be a record that the manifest 7 in the manifest store 5 contains a reference to that specimen data chunk b. The same applies for the information in the sparse chunk index 8 relating to specimen data chunk d.

In one embodiment, the information contained in the sparse chunk index 8 on a given specimen data chunk 6 includes the chunk identifier of that specimen data chunk 6.

In one embodiment, part of the chunk identifier may be stored in the sparse chunk index 8 implicitly. That is, the location of the remaining part of the chunk identifier may implicitly specify the first part. For example, it is common in hash tables (the sparse chunk index 8 may be implemented as a hash table) for the first few bits of a key to specify which slot of the hash table information about that key is stored in; because every item in that slot has a key with the same first few bits, there is no need to explicitly store those bits.

In one embodiment, only a partial chunk identifier may be stored in the sparse chunk index 8 to reduce storage requirements. Thus, two different specimen data chunks may have the same partial chunk identifier. A disadvantage of storing only partial chunk identifiers is that data processing apparatus embodying the present invention may choose manifests poorly based on the misleading (partial) information in the sparse chunk index 8, leading to poorer deduplication (e.g., duplicate copies of unique specimen data chunks 6 will exist in the chunk store 4). The apparatus may thus assume, by referring to the partial chunk identifiers in the chunk index 8, that a specimen data chunk corresponds to an input data chunk 2 being processed, even though they may be different.

Embodiments of the present invention may include a verification step, described later. Such a verification step may discount specimen data chunks which do not correspond to an input data chunk 2, despite their respective partial chunk identifiers indicating that they correspond. An advantage of storing only partial chunk identifiers is that the size of the sparse chunk index 8 is reduced still further. This benefit is in addition to reduction in size of the sparse chunk index 8 as a result of only storing information on some specimen data chunks 6.

In one embodiment, the information contained in the sparse chunk index 8 for a specimen data chunk 6 includes a reference to every manifest 7 which is in the manifest store 5 and includes a reference to that specimen data chunk 6. That is, for each specimen data chunk 6 having an entry in the sparse chunk index 8, there is stored a list of all manifests 7 in the manifest store 5 which contain at least one reference to that specimen data chunk 6. In another embodiment, there may be stored only a partial list of the manifests 7 in the manifest store 5 which contain at least one reference to that specimen data chunk. Thus, although there may be many manifests stored in the manifest store which include a reference to a specimen data chunk 6 having an entry in the sparse chunk index 8, the sparse chunk index 8 may only contain details on a limited number of those manifests.

In use, the manifest store 5 may contain many manifests 7, each representing a previously processed data segment 1. In one embodiment, the manifest store 5 contains information relating to each manifest 7 contained therein. The information may include the properties associated with each manifest 7; such as its size, the number of references it contains or the name and other details of the data set which it represents. The information for a particular manifest may include a chunk identifier of at least one of the specimen data chunks 6 referenced by the manifest 7.

Deduplication: Hooking

In one embodiment, data processing apparatus 3 uses the sparse chunk index 8 and an identified manifest 7 in an attempt to identify which input data chunks 2 of an input data segment being processed already have corresponding specimen data chunks 6 in the chunk store 4. As a consequence, in one extreme embodiment, there may be stored only one copy of each unique specimen data chunk 6, regardless of how many times input data chunks corresponding to that specimen data chunk 6 appear in input data segments being processed. The process of eliminating, or at least reducing, the multiple storage of data is called deduplication (sometimes also referred to as compaction).

The input data segment 1 in FIG. 1 may comprise just one segment of a larger data set. As described above, a data set may comprise many data segments. Numerous segmentation algorithms are available to the skilled person to segment input data. In some embodiments, the boundaries—i.e. the extent of the segments—may be chosen arbitrarily, with little or no regard to the content of the segments as divided.

Figure 4:
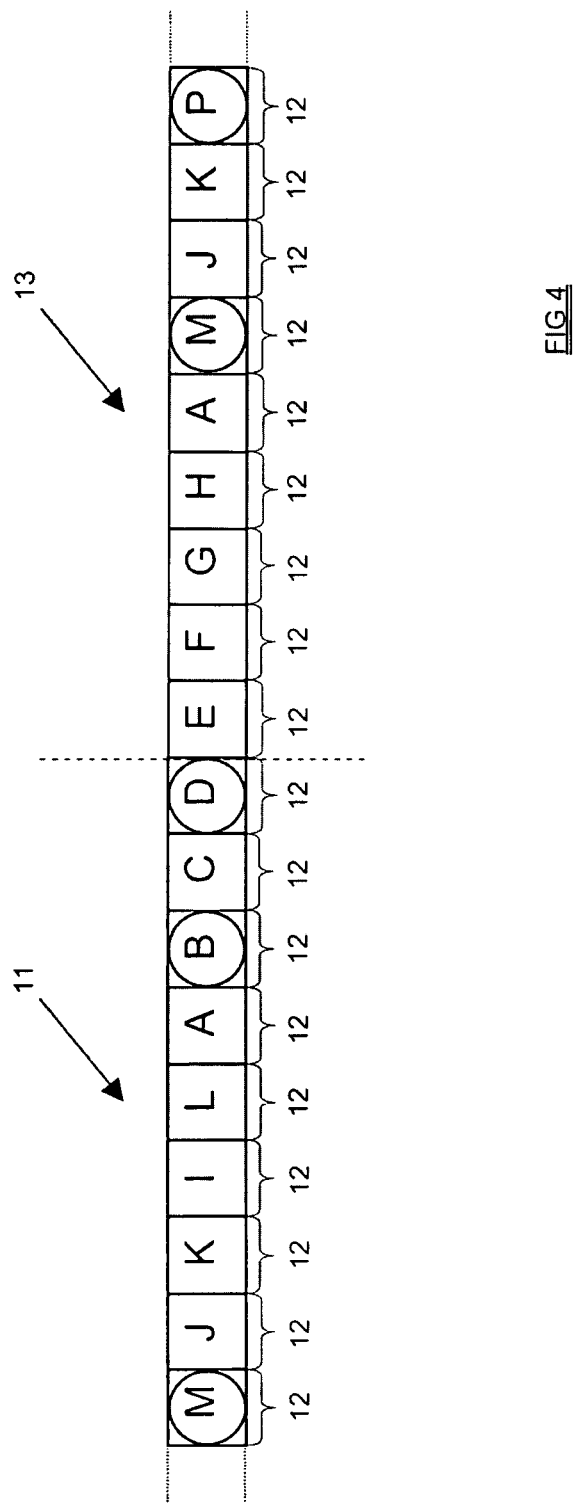
FIG. 4 shows a schematic representation of another two data segments.

FIG. 4 represents a part of a data set to be subsequently processed by the data processing apparatus of the present invention. FIG. 4 shows a part of a data set having been segmented into two segments 11 and 13. Input data segment 11 comprises the input data chunks MJKILABCD and data segment 13 comprises the input data chunks EFGHAMJKP.

In processing the input data segments 11 and 13, the data processing apparatus embodying the present invention may process each input segment sequentially, in turn. In one embodiment, input data segment 1, shown in FIG. 1, may have been processed immediately before input data segment 11 of FIG. 4. In other words, input data sets 1, 11 and 13 may together form sequential parts of a larger data set.

Without the use of data processing apparatus embodying the present invention, the contents of input data segment 11 may otherwise be stored in its entirety. Thus, even though it can be seen by the reader that both input data segment 1 (now stored as a manifest 7 in the manifest store 5) and input data segment 11 comprise the common input data chunks A, B, C and D, each occurrence of the duplicated input data chunks would be stored in the chunk store 4 as a specimen data chunk. This may represent an inefficient use of the chunk store 4. Data processing apparatus embodying the present invention may reduce the duplication of data.

With data processing apparatus 3 embodying the present invention, when the input data segment 11 is presented to the data processing apparatus 3, the input data segment 11 is processed into input data chunks 12. The data processing apparatus 3 embodying the present invention is operable to use the sparse chunk index 8 to identify at least one manifest 7 in the manifest store 5 that includes at least one reference to a specimen data chunk corresponding to at least one of the input data chunks 12 of input data set 11 and on which there is information contained in the sparse chunk index 8.

As shown in FIG. 3, (before processing input data segment 11) the chunk store 4 contains specimen data chunks A, B, C, D, E, F, G and H, which each represent input data chunks 2 that were present in input data segment 1, shown in FIG. 1. In addition, the manifest store 5 includes a manifest 7 representative of input data segment 1, comprising references to each of the specimen data chunks 6 stored in the chunk store 4. The input data segment 1 of FIG. 1 may be re-built using the manifest 7 in the manifest store 5 and the specimen data chunk 6 in the chunk store 4.

In addition, as mentioned above, the sparse chunk index 8 is configured for containing information on only some specimen data chunks 6. In one embodiment, the sparse chunk index is configured to contain information on only those specimen data chunks having a predetermined characteristic.

With further reference to FIG. 3, it will be noted that only specimen data chunks B and D have an entry in the sparse chunk index 8. None of the specimen data chunks A, C, E, F, G or H have a reference in the sparse chunk index 8.

In one embodiment, the information in the sparse chunk index 8 may comprise the chunk identifier, or partial chunk identifier, of the specimen data chunks B and D; and further at least a partial list of manifests 7 in the manifest store 5 which comprise a reference to the specimen data chunks B and D—in another embodiment, there may be a full list of manifests. In the example shown in FIG. 3, there is only one manifest 7 currently contained in the manifest store 5. Thus, in the sparse chunk index 8, against each entry for specimen data chunks B and D, there will be stored a reference only to the single manifest 7 stored in the manifest store 5.

Data processing apparatus 3, upon receiving input data segment 11 of FIG. 4, is operable to process the input data segment 11 into input data chunks 12. For each input data chunk 12, a chunk identifier may be generated. In one embodiment, each of the chunk identifiers generated may be compared with all the entries in the sparse chunk index 8, to find a specimen data chunk corresponding to an input data chunk. It will be seen that input data segment 11 comprises input data chunks B and D, which correspond to specimen data chunks B and D. Thus, in this embodiment, following the comparison of each of the input data chunks in input data segment 11 with the entries in the sparse index, it will be noted that there are two entries in the sparse chunk index 8 which refer to specimen data chunks corresponding to input data chunks B and D.

In another embodiment, only those input data chunks of input data segment 11 having a predetermined characteristic will be compared with the entries in the sparse chunk index 8. In this example, because input data segment 11 comprises both input data chunks B and D, which both happen to have the predetermined characteristic, positive matches will be found for both input data chunks B and D in the sparse chunk index 8. This embodiment may increase the speed at which the processing of a data segment may be carried out. As a result of the sparse chunk index only containing entries for specimen data chunks having the predetermined characteristic, there may be little or no benefit in comparing the input data chunks not having the predetermined characteristic with the entries in the sparse chunk index. This is because no match will be found. For this reason, the provision of a sparse chunk index embodying the present invention may significantly reduce the time taken to process an input data segment and, importantly, reduce the RAM needed.

In addition, it will be seen in FIG. 4 that input data chunk M also has a predetermined characteristic. Thus, input data chunk M may also be compared with the entries in the sparse chunk index 8. However, in this case, because there is no entry in the sparse chunk index relating to a specimen data chunk M, no such results will be returned. An entry for specimen data chunk M may later be added to the sparse chunk index, as will be discussed below.

In the present example, there is only one manifest 7 currently stored in the manifest store 5. In some implementations of the present invention, the manifest store 5 may comprise a plurality of manifests 7. Thus, it is to be appreciated that the sparse chunk index 8 may comprise a plurality of entries, each entry referring to a plurality of different manifests in the manifest store which reference that specimen data chunk corresponding to the entry.

Referring to the example shown in FIG. 4, upon processing input data segment 11, data processing apparatus embodying the present invention will identify ("return") the manifest 7 stored in the manifest store 5 for subsequent operation. Data processing apparatus embodying the present invention is operable to analyse the returned manifest(s) in order to make a determination of which input data chunks of the input data segment 11 are already present in chunk store 4. In some embodiments, only a subset of the returned manifests may be so analysed. In one embodiment, the data processing apparatus is operable to review the returned at least one manifest and identify at least one reference to a specimen data chunk 6 corresponding to at least one other input data chunk of the input data segment 11. For example, there may be identified references to specimen data chunk 6 corresponding to further input data chunks 12 of the input data segment 11.

In one embodiment each input data chunk 12 of the input data segment 11 is compared with each specimen data chunk 6 referenced by the returned manifest 7. Thus, each of the input data chunks of input data segment 11 "MJKILABCD" will be compared with the specimen data chunks "ABCADEFGH" referenced by the returned manifest 7. Of course, comparisons may not need to be made between the input data chunks 12 (A and D) which caused the manifest to be returned because it is already known that they match one another.

In one embodiment, the full chunk identifier of each input data chunk 12 may be compared with the full chunk identifiers of each specimen data chunk 6 referenced in the identified manifest 7. In one embodiment, described above, the manifest may contain the chunk identifier for each specimen data chunk 6 referenced by the manifest 7. Accordingly, the comparison step may be performed by using only the information contained in a returned manifest and the chunk identifiers generated for the input data segment 11. The benefit of this is that there may be no need to refer to the sparse chunk index 8 or the chunk store 4 for further information.

With further reference to FIG. 4, by comparing each of the input data chunks 12 of the input data segment 11 with the specimen data chunk 6 referenced by the returned manifests, it may be determined that input data chunks A and C correspond to specimen data chunks A and C already stored in the chunk store 4 (because the returned manifests contains a reference to them) In one embodiment, it will be determined that the chunk identifiers of input data chunks A and C are identical to the chunk identifiers contained in the manifest, which manifest references corresponding specimen data chunks A and C in the chunk store.

In any event, data processing apparatus embodying the present invention may determine that specimen data chunks 6 corresponding to input data chunks A, B, C and D already exist. Accordingly, specimen data chunks corresponding to input data chunks A, B, C and D of input data segment 11 need not be stored again in the chunk store 4. The footprint of storing original input data set 1 and input data segment 11 may be smaller than their accumulative original size.

With further reference to the input data segment 11 shown in FIG. 4, it will be noted that the segment further comprises input data chunks M, J, K, I and L. It will be appreciated that none of these input data chunks 12 were found to correspond to any of the specimen data chunks 6 referenced by the returned manifest 7—i.e. the comparison step will have revealed no matches.

Input data chunks M, J, K, I and L may therefore be added to the chunk store as specimen data chunks.

Data processing apparatus embodying the present invention is further operable to compile a manifest for the input data segment 11. As described above with reference to the example shown in FIG. 4, it has been determined that the chunk store 4 already contains specimen data chunks A, B, C and D, which correspond to input data chunks A, B, C and D of input data segment 11. A manifest for the input data segment 11 may therefore be compiled with references to those specimen data chunks 6. The benefit of this is that a portion of the manifest for input data segment 11 has already been compiled, without any further specimen data chunks having been added to the chunk store. In addition, as input data chunks M, J, K, I and L are added to the chunk store, the manifest for input data segment 11 is compiled with references to those specimen data chunks. The new manifest may then be added to the manifest store 5.

In addition, further information may be added to the sparse chunk index. For example, it will be noted that both the manifests now stored in the manifest store reference specimen data chunks B and D. Data processing apparatus embodying the present invention is operable to add a reference against each relevant record in the sparse chunk index to those manifests. Thus, for the entry b (pertaining to specimen data chunk B) in the sparse chunk index 8, there will be a reference to both the manifests in the manifest store. The same applies for the entry d in the sparse chunk index 8 (pertaining to specimen data chunk D).

In addition, it will be noted that input data chunk M of input data segment 11 has the predetermined characteristic—denoted by a circle. A new entry may be made in the sparse chunk index relating to specimen data chunk M. The entry may contain a reference to the newly added manifest in the manifest store 5; but not the other manifest because it does not contain a reference to a specimen data chunk corresponding to input data chunk M.

When processing future input data segments which comprise an input data chunk corresponding to specimen data chunk M, the newly added manifest may be identified and may be used in a comparison step with the new input data segment.

The benefit of maintaining a sparse chunk index is that less memory is required than if a 'full' chunk index was stored (i.e. one which contains information on every specimen data chunk). However, even when using a sparse chunk index, data processing apparatus embodying the present invention may still be operable to identify references in previous manifests to specimen data chunks which correspond to input data chunks of a data segment being processed.

With reference to FIGS. 3 and 4, although the sparse chunk index contains information on only specimen data chunks B and D, these entries nevertheless cause the first manifest to be identified. Conveniently, from that returned manifest, it was identified that input data segments 11 also comprise input data chunks A and C, which already exist as specimen data chunks in the chunk store.

The operation of the invention in this manner may be referred to as "hooking" and may be thought of, conceptually, as attaching hooks to manifests at each reference to a specimen data chunk on which the sparse chunk index contains information. Thus, when an input data segment is processed, manifests which reference a specimen data chunk corresponding to an input data chunk of the input data segment and on which there is information contained in the sparse chunk, index, are "pulled in" for analysis. The more "hooks" of the given manifest that match input data chunks of the input data segment, the more likely it is to be "pulled in" and, as a result of having more "hooks", the more useful the manifest is likely to be for de-duplication.

A benefit of data processing apparatus 3 embodying the present invention is that an exhaustive search of the chunk store 4 for each and every input data chunk 2, to determine whether it has already been stored as a specimen data chunk 6, is not required. Instead, data processing apparatus 3 embodying the present invention may utilise the manifests 7 created for previously processed and stored data segments. The benefits of data processing apparatus 3 embodying the present invention are further demonstrated when the input data segments being processed are similar, to a large extent, to previously processed data segments. For example, between two full back-up operations, only a small portion of the respective data segments may be different. To have to methodically search through each specimen data chunk 6 stored in the chunk store 4, to find specimen data chunks 6 corresponding to each input data chunk of an input data segment, may be inefficient and time consuming.

Data processing apparatus 3 embodying the present invention may be able to exploit the fact that each input data segment 1 being processed may be similar. As such, previous similar manifests can be used to compile at least a part of a new manifest for the latest input data segment.

In one embodiment, having identified said at least one manifest by "hooking", the data processing apparatus 3 is operable to search within those manifests for all other references to specimen data chunks 6 in the chunk store 4 that correspond to other input data chunks of an input data segment being processed. In one embodiment, the search is performed by selecting each input data chunk from an input data segment in turn—save possibly for the input data chunk which caused the manifest to be identified—and comparing it with each reference in the identified manifest(s). When a reference to a corresponding specimen data chunk 6 is found, the corresponding input data chunk is represented in a new manifest with a reference to the specimen data chunk 6. The search operation may continue until all input data chunks have been compared with all references in the identified manifest(s).

In another embodiment, the search operation may be terminated when, for a given manifest, a predetermined number of references to specimen data chunks 6 corresponding to input data chunks have been found. The search operation may search the identified manifests one at a time. In one embodiment, the search operation may be terminated when the current manifest being searched is found to have fewer than a predetermined number (possibly a percentage of the number of input data chunks or references in the current manifest) of references to specimen data chunks 6 corresponding to the input data chunks. In another embodiment, the search operation may be terminated when the current manifest being searched is found to have fewer than a predetermined number of references to specimen data chunks 6 corresponding to input data chunks not already determined to have corresponding specimen data chunks 6 in the chunk store 8. A benefit of these embodiments is that manifests that do not seem to contain references to specimen data chunks 6 corresponding to any other input data chunks may quickly be discounted from the search procedure. In another embodiment, the search operation may be terminated after having processed a given number of manifests.

A benefit of an embodiment of the invention is demonstrated when the chunk store 4 contains many specimen data chunks 6. Suppose that many of the specimen data chunks 6 have been stored in the chunk store 4 for a long period of time and new input data segments being processed seldom or never include input data chunks 2 which correspond to those 'old' specimen data chunks 6. Suppose further that a number of the most recently processed input data segments 1 contain references to the most recently added specimen data chunks 6 to the chunk store 4. Without data processing apparatus 3 embodying the present invention, each and every input data chunk of a new input data segment may be compared with each specimen data chunk 6 stored in the chunk store 4. Such data processing apparatus, not embodying the present invention, would, therefore, compare input data chunks with specimen data chunks 6 which are unlikely to be found to match. This would especially be the case where the 'old' specimen data chunks 6 are stored at the beginning of the chunk store 4, and are therefore likely to be searched first.

Data processing apparatus 3 embodying the present invention, on the other hand, may identify at least one manifest 7 in the manifest store 5 that includes at least one reference to a specimen data chunk 6 corresponding to at least one input data chunk 2. Embodiments of the present invention, therefore, can exploit the fact that input data segments containing a particular input data chunk, which input data chunk corresponds to a specimen data chunk 6 already in the chunk store 4 and having an entry in the sparse chunk index 8, may also contain input data chunks which correspond to other specimen data chunks 6 already stored in the chunk store 4.

In one embodiment of the present invention, after generating a chunk identifier for an input data chunk 2, and identifying a corresponding chunk identifier in the sparse chunk index 8 relating to a specimen data chunk 6 stored in the sparse chunk index 8, data processing apparatus 3 embodying the present invention is operable to perform a verification procedure. The verification procedure comprises comparing the input data chunk 2 with the identified specimen data chunk 6 stored in the chunk store 4, to confirm whether the two data chunks in fact have the same contents. Without the verification procedure, particularly where partial chunk identifiers are used, it may be that a specimen data chunk 6 identified as 'corresponding' actually has different content than the input data chunk 2. To include a reference to the non-corresponding specimen data chunk 6 will introduce an error in the manifest, and prevent accurate restoration of data represented in the manifests.

In another embodiment, the verification procedure may be performed by comparing the chunk identifier of an input data chunk with a chunk identifier contained in an identified manifest. A benefit of this is that no access to the chunk store may be required at all. The verification procedure may be performed using solely the information contained in the manifest and the chunk identifiers produced for the input data chunks. Where partial chunk identifiers are stored in the sparse chunk index 8, a situation may exist where the chunk identifier of an input data chunk matches the partial chunk identifier of a specimen data chunk stored in the sparse chunk index 8, even though the respective input/specimen data chunks do not match one another. As a consequence, the manifests identified as containing a reference to a specimen data chunk corresponding to an input data chunk may not, in fact reference specimen data chunks corresponding to any input data chunks. In one embodiment, the data processing apparatus is operable to perform a verification procedure on the identified manifest(s). In one embodiment, when at least one manifest has been identified, the chunk identifier stored in the manifest(s) of the specimen data chunk which was indicated as corresponding to an input data chunk is verified. Only if the chunk identifier is identical to the chunk identifier of the input data chunk may the manifest be used for subsequent operations. This embodiment may achieve the same effect as performing the verification procedure by reading from the chunk store 4, but does not require access to the chunk store 4. It will be appreciated that the returned manifest may be much smaller in size than the chunk store 4. Accordingly, performing a comparison procedure using the identified manifest, and not the chunk store 4, may allow for at least a part of the data for comparison to be processed whilst in RAM.

Data processing apparatus embodying the present invention may be used in compacting input data sets for storage, encryption or transmission. For example the input data may represent sets of back-up data from a first data storage medium, for storing on a second data storage medium. Data processing apparatus 3 embodying the present invention, as described above, compares a chunk identifier of an input data chunk 2 with the chunk identifiers stored in a sparse chunk index 8. The step of comparison may require ready access to the data contained in the sparse chunk index 8. In one embodiment, the sparse chunk index 8 may be stored in random access memory (RAM). RAM allows quick, and random, access to the information contained therein. There may be a requirement, however, to reduce the RAM required for a data processing apparatus. By providing a sparse chunk index 8 to be stored in RAM, data processing apparatus embodying the present invention requires less RAM than processing apparatus without a sparse index.

Without providing a chunk index, data processing apparatus may compare an input data chunk 2 with each specimen data chunk 6 stored in the chunk store 4. Since the chunk store 4 may be very large, it may be difficult, or simply not possible, to store the entire contents of the chunk store 4 in RAM. The chunk store 4 may be stored in non-volatile memory, such as on disk. Reading data from the chunk store 4, therefore, will require a disk reading operation. This may be significantly slower than accessing data stored in RAM. Data processing apparatus 3 embodying the present invention comprises a sparse chunk index 8, which may reside in RAM, allowing faster access to the information contained therein. As a result, specimen data chunks 6 stored in the chunk store 4 which correspond to an input data chunk 2 may more easily be identified, without requiring constant direct access to the chunk store 4. There may, as described above, be a verification procedure. This operation may require access to a specimen data chunk 6 stored in the chunk store 4, on disk, but this may require only one disk seek of the chunk store 4 and the retrieval of a single specimen data chunk 6.

With embodiments of the present invention comprising a sparse chunk index 8, for a first input data chunk, there may exist a first specimen data chunk 6 in the chunk store corresponding to the first input data chunk; but there is no entry relating to the first specimen data chunk 6 in the sparse chunk index 8. There may, however, be an entry in the sparse chunk index 8 for a second specimen data chunk 6 matching a second input data chunk. Data processing apparatus embodying the invention will then identify the manifest(s) which reference the second specimen data chunk 6. A subsequent search of those manifest(s) may be carried out. It may be that the identified manifest(s) do not contain references to the first specimen data chunk. Or, any search operation within the manifest(s) may have been terminated before finding a reference to the first specimen data chunk 6, even though a manifest may contain a reference to the first specimen data chunk 6.

It may be that the stored manifests which reference the first corresponding specimen data chunk 6 do not reference the second specimen data chunk 6. In which case, data processing apparatus embodying the invention would not identify the first specimen data chunk 6 when analysing the manifests containing the second specimen data chunk 6.

Consequently, data processing apparatus embodying the present invention may store the first input data chunk in the chunk store as a new specimen data chunk 6, despite that there is already a specimen data chunk 6 in the chunk store 4 corresponding to the input data chunk.

Nevertheless, the benefits of requiring less RAM, and the decrease in the time taken to search through the sparse chunk index 8 may outweigh the disadvantages of the storage of some input data chunks 2 as specimen data chunks 6 for the second time.

Data processing apparatus embodying the present invention may be operable to identify specimen data chunks 6 in the chunk store 4 corresponding to at least some input data chunks 2, whilst only comprising a sparse index. There may, in one extreme, perhaps ideal, example, be no duplicate entries in the chunk store 4. Data processing apparatus 3 with a sparse chunk index 8 may be just, or almost, as efficient at compacting input data as a data processor 3 with a full chunk index 8. By efficient is meant that the specimen data chunks 6 stored in the chunk store 4 are not duplicated, or at least not duplicated to a predetermined extent. Some duplication of specimen data chunks may be permitted. Further, some misidentification of manifests 7 comprising a reference to a specimen data chunk 6 corresponding to an input data chunk may be permitted. Embodiments of the present invention may be configured according to the balance of convenience—the envisaged disadvantage of allowing some duplication of data or misidentification of manifests 7 may be balanced, or outweighed, by the corresponding decrease in the size of sparse chunk index 8 required, or the corresponding increase in efficiency of the apparatus as a whole.

Data processing apparatus embodying the present invention will now be described with reference to FIG. 4.

As noted above, FIG. 4 discloses a part of a data set comprising input data segments 11 and 13. As described above, input data segment 11 has been processed and a corresponding manifest added to the manifest store. Next, data processing apparatus embodying the present invention may process input data segment 13. It will be seen from FIG. 4 that input data segment 13 comprises input data chunks E, F, G, H, A, M, J, K, P.

Thus, as before, input data segment 13 will be processed into input data chunks 12. Each of those input data chunks 12 may then be "looked up" in the sparse chunk index 8. In one embodiment, only those input data chunks 12 of input data segment 13 having a "predetermined characteristic" may be looked up in the sparse chunk index 8. In any event, the purpose is to compare at least one of the input data chunks 12 of input data segment 13 with the "hooks" stored in the sparse chunk index 8.

It will be seen from FIG. 4 that only input data chunks M and P of input data segment 13 have the predetermined characteristic. Thus, in processing input data segment 13, the data processing apparatus will identify manifests having at least one reference to one of said specimen data chunks that corresponds to an input data chunk of input data segment 13 and on which there is information contained in the sparse chunk index. As described above, following the processing of input data segments 1 and 11, there will be two manifests 7 stored in the manifest store 5. In addition, there will be an entry in the sparse chunk index 8 for each of specimen data chunks B, D and M. It will be noted that only the second manifest 7 in the manifest store 5—i.e. that relating to input data segment 11) contains a reference to specimen data chunk M. Accordingly, in processing input data segment 13, the data processing apparatus embodying the present invention may "look up" each of the input data chunks 12 of input data segment 13 and compare each of those input data chunks with the entries in the sparse chunk index 8. In another embodiment, only those input data chunks 12 of input data segment 13 having the "predetermined characteristic"—i.e. M and P—may be "looked up" in the sparse chunk index 8. In such an embodiment, it will be found that there is an entry in the sparse chunk index 8 relating to specimen data chunk M which corresponds to input data chunk M of input data segment 13. As a result, data processing apparatus will return the second manifest 7 that is stored in the manifest store 5 (i.e. that relating to input data segment 11). No results will be returned from input data chunk 'P', although an entry for P may be added to the sparse index.

Subsequently, the data processing apparatus may compare each of the input data chunks 12 of input data segment 13 with each of the references contained in the returned manifest (for manifest 11). In another embodiment, the chunk identifiers of the corresponding input and specimen data chunks may be compared with one another, as described above.

As a result of the comparison step, it will be determined that the returned manifest, relating to input data segment 11, further comprises references to specimen data chunks J and K, which correspond to input data chunks J and K of input data segment 13. Accordingly, a manifest may be compiled for input data segment 13, including references to specimen data chunks M, J and K already stored in the chunk store 4.

It will be noted that the returned manifest does not contain any references to specimen data chunks that correspond to input data chunks E, F, G, H, A and P of input data segment 13.

Accordingly, without the further features of the data processing apparatus embodying the present invention (described below), each of the input data chunks E, F, G, H, A, and P may be added to the chunk store as specimen data chunks. This is despite the fact (as will be noted by the reader) that specimen data chunks E, F, G, H and A already exist in the chunk store. Thus, without the further features of the present invention, as described below, unnecessary duplication of the data in the chunk store may ensue.

Data processing apparatus embodying the present invention is operable to identify specimen data chunks corresponding to other input data chunks of the segment being processed by using at least one manifest identified when processing at least one other segment of previous input data.

Thus, with reference to the example shown in FIG. 4, the data processing apparatus embodying the present invention is operable to compare the input data chunks 12 of input data segment 13 with at least some of the specimen data chunks referenced by the manifests returned when processing the previous input data segment 11.

As described above, when processing input data segment 11, the first manifest 7 to be added to the manifest store was also returned.

Accordingly, when using a data processing apparatus embodying the present invention, all of the input data chunks 12 of input data segment 13 may be compared with all of the specimen data chunks 4 referenced by each of the manifests in the manifest store.

Accordingly, in carrying out the comparison step, it will be noted that the other manifest in the manifest store comprises references to specimen data chunks E, F, G, H and A, which correspond to the first five input data chunks 12 of input data segment 13. The only input data chunk 12 in input data segment 13 not to be found to have a corresponding data chunk is input data chunk P. Accordingly, in one embodiment, a specimen data chunk P corresponding to input data chunk P may be added to the chunk store.

It will be appreciated that by using at least one manifest identified when processing at least one other input segment of input data, the duplication of specimen data chunks may be reduced. In the example described above with reference to FIG. 4, the chunk store now contains only a single instance of each specimen data chunk. Without the data processing apparatus embodying the present invention, there may have been duplicates of at least specimen data chunks E, F, G, H and A in the chunk store. Additionally, because input data chunk P (and thus its corresponding specimen data chunk) has the predetermined characteristic, information relating to the specimen data chunk P may be added to the sparse index, in the manner described above.

In using data processing apparatus embodying the present invention, it will be seen that eight of the nine input data chunks 12 of input data segment 13 have been found to correspond to specimen data chunks already present in the chunk store, in the example shown.

Figure 5:
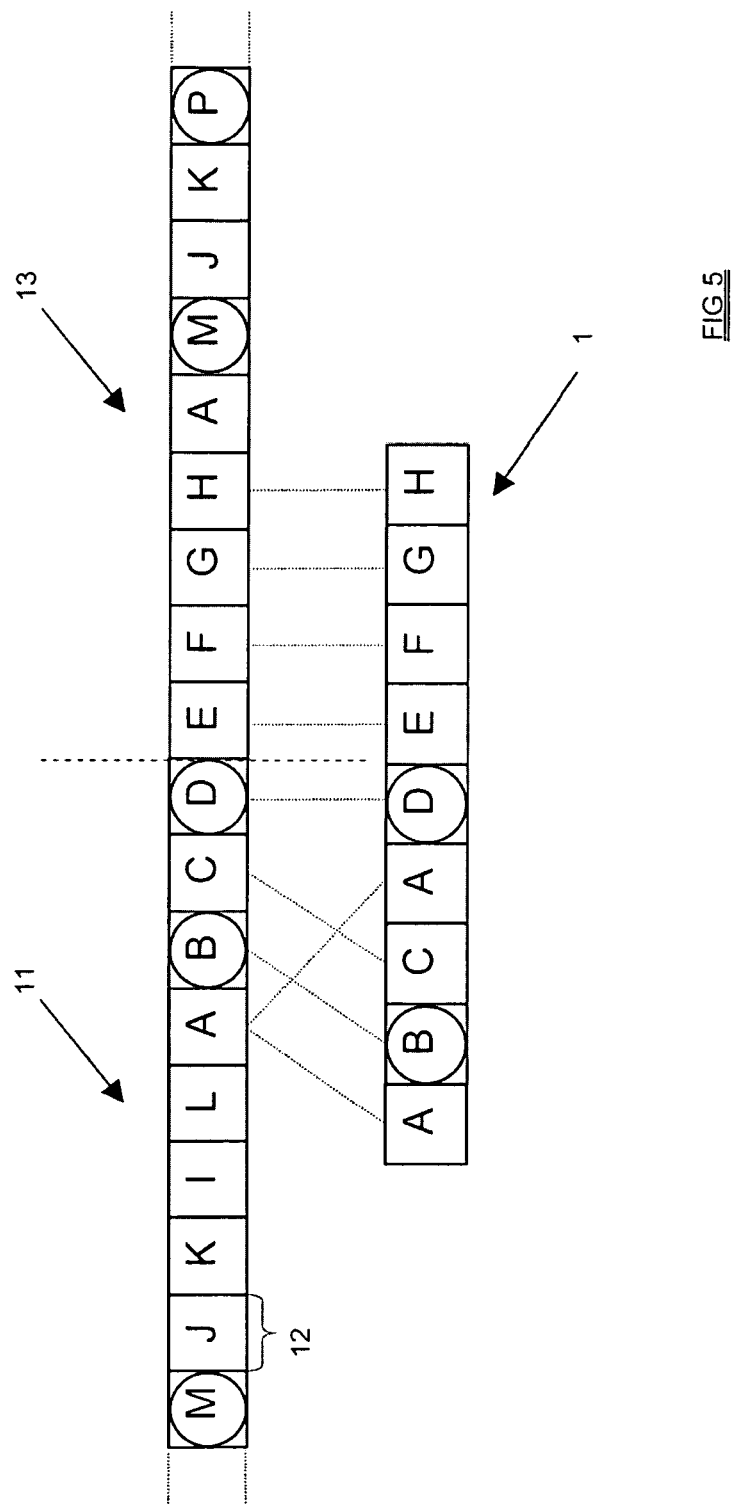
FIG. 5 shows a schematic representation of the data segments of FIGS. 1 and 4

When comparing the input data chunks of input data segments 1, 11 and 13, as demonstrated in FIG. 5, it will be seen by the reader that the pattern of chunks in input data segment 1 is almost identical to the run of input data chunks 12 bridging the boundaries of input data segments 11 and 13. In other words, if the boundaries of input data segment 11 and 13 were to be shifted to the right (when referring to FIG. 4) by five spaces, then the resultant input data segment 11 will correspond almost entirely to the manifest created for input data segment 1. However, in practice, the arbitrary nature of where the segment boundaries are made may dictate that runs or patterns of input data chunks are split by the boundary of an input data segment. Data processing apparatus embodying the present invention seeks to overcome some of the disadvantages of this phenomenon.

With reference to the figures, it will be noted that only input data chunks B and D of input data segment 1 have the predetermined characteristic. Thus, in order to subsequently retrieve a manifest for input data segment 1, the input data segment being processed must comprise at least one of input data chunks B and D, so that the manifest corresponding to input data segment 1 may be "hooked".

Even though input data segment 13 comprises input data chunks E, F, G, H, none of those input data chunks has the predetermined characteristic, so the occurrence of that run of input data chunks (E, F, G, H) in an input data segment will not necessarily "hook" the manifest corresponding to input data set 1.

The underlying principle of the invention is that a pattern may exist within a stream of input data segments, which pattern happens to be divided by a segment boundary. In using data processing apparatus embodying the present invention, particularly by using at least one manifest identified when processing another input data segment, the final part of the at least one manifest identified when processing another input data segment may be found to correspond to the initial part of the input data segment being processed.

Prioritization of Manifests

As described above, data processing apparatus embodying the present invention is operable to identify manifests having at least one reference to one of said specimen data chunks that corresponds to one of said input data chunks and on which there is information contained in the sparse chunk index. Thus, data processing apparatus uses "hooks" in the sparse chunk index to return a list of manifests.

In addition, the data processing apparatus is operable to use at least one manifest identified when processing at least one other segment of input data.

All the manifests so-identified may be referred to as "candidate" manifests.

All the candidate manifests may be prioritised for subsequent operation. The candidate manifests may be prioritised according to the value of a score which has been assigned to each of the candidate manifests.

As described above, when processing an input data segment, all of the input data chunks having a predetermined characteristic are "looked up" in the sparse chunk index—we refer to these as 'look-up' chunks. Against each of the entries in the sparse chunk index for a specimen data chunk, there is a list of at least one manifest containing a reference to that specimen data chunk. In some cases, a manifest in the manifest store may have references to more than one specimen data chunk having an entry in the sparse chunk index and which corresponds to a look-up chunk. For example, in processing an input data segment having input data chunks B and D, the manifest corresponding to input data segment 1 will be identified, and it will contain two references to specimen data chunks which have an entry in the sparse chunk index and which correspond to those look-up data chunks B and D. On this occasion, it may be said that the manifest has two "hits". The more "hits" a manifest has, the more references it will contain to specimen data chunks which correspond to look-up data chunks of an input data segment being processed. It may thus be assumed that the higher number of "hits" a manifest has, the more likely it is to at least partially match the input data segment being processed.

Method A

In one embodiment, a score is assigned to each returned manifest based on the number of "hits" it has. The score for each manifest is therefore equal to the number of specimen data chunks that the manifest references which have an entry in the sparse chunk index and which correspond to look-up chunks in the input data segment being processed. The manifests having the most "hits" may be prioritised first, since it is probable that those manifests are similar to the input data segment being processed.

The manifests with the highest score may be chosen for subsequent operation. The subsequent operation may be the comparison of the specimen data chunks referenced by the manifest with all the input data chunks of the data segment being processed.

After all of the input data chunks have been compared with the specimen data chunks referenced by the manifest, any corresponding input data chunks will be represented in a newly-compiled manifest for that input data segment by a reference to the corresponding specimen data chunk.

When a manifest is selected from the candidate manifest list, it may be said that the chosen manifest is a "champion".

After the current champion manifest has been processed, another champion may be selected from the candidate manifests. The next champion manifest to be selected may be the manifest with the second highest score (the previous champion having the highest score).

It will be appreciated that there may be many manifests contained in the candidate list and only some of those may be chosen as champions. As described above, processing of an input data segment may finish after a predetermined condition has been met. That condition may, in one embodiment, be that an input data segment has been compared with a predetermined number of returned manifests. Or, in a preferable situation, it may be that specimen data chunks corresponding to all of the input data chunks of the input data segment being processed have been found. There is thus no reason to continue processing.

In any event, there may be far fewer "champions" than total candidate manifests.

When a champion manifest has been processed, it may be removed from the candidate list. Alternatively, it may remain in the candidate list but provisions made to ensure that it will not be selected as a champion again in processing the current input data segment.

Method B

In an alternative embodiment, the scores of the candidate manifests may be recalculated after a champion has been selected. In one embodiment, the score of a manifest is recalculated to be equal to the number of references each manifest contains to look-up chunks which were NOT referenced by the previously selected champions. Thus, if a champion comprises references to specimen data chunks that correspond to particular look-up chunks, then any remaining candidate manifests only comprising references to the same specimen data chunks will have a score of zero.

In other words, when a manifest has been retrieved and chosen as a champion, that used a particular 'hook', any manifests also retrieved using that hook will not be given priority because of that hook in subsequent processing of manifests.

Method C

In one embodiment of the present invention, recently retrieved or created manifests are held in a manifest cache. The cache may hold a predetermined number of manifests. Preferably, the cache is held in RAM.

As each input data segment is processed, its champions (or at least some) are retrieved from disk and stored in the cache. Newly created manifests may also be added to the cache. If the cache holds a predetermined number of manifests, adding manifests to the cache may require evicting existing manifests from the cache. Any of the known accounting methods of managing a cache can be used to determine which manifest to evict (e.g., least recently used, least frequently accessed, etc.). A particular embodiment of the present invention uses the 'least recently used' method.

In another embodiment, which manifest to evict from the cache next is decided (in part) by attempting to estimate how useful each manifest will be for the next couple of input data segments to be processed, and then evicting the least useful appearing manifests first. For example, a manifest could be deemed more useful if it covers the last 10% of chunks of the current input data segment.

In one embodiment, candidates which are already present in the manifest cache may have their scores weighted so that they appear higher in the candidate list than do otherwise equivalent manifests that are not in the manifest cache. By 'higher' is meant the candidate manifest has a relatively higher effective score. The more recently added manifests may therefore be more likely to be picked as champions. Extra weight may be given to manifests already in the cache because they are cheaper to compare against (no disk access required) and thus it is beneficial to use them first, even if otherwise somewhat inferior, in the hope of avoiding expensive disk accesses brought about by retrieving manifests from disk and introducing them into the cache.

In one embodiment, the extra weighting may not be given to a manifest if its score would otherwise have been zero in processing the present input data segment. This is to avoid comparing a manifest with an input data segment which has no references to specimen data chunks corresponding to look-up chunks in the input data segment.

Method D

In one embodiment, an additional bonus may be added to the score of the candidate manifests based on when they were last chosen as a "champion". The score may be based at least in part on how recently a given manifest was selected as a champion in processing previous input data segments. For example, if a candidate manifest was selected as a champion manifest when processing the immediately preceding input data segment, then it is likely that it will be of use in processing the present input data segment. Its score may be adjusted accordingly, so as to increase its chance of being picked as a champion in processing the current input data segment. Further, if a given candidate manifest was last picked as a champion when processing a much earlier input data segment, then it is less likely to be of use when processing the present input data segment. Its score may be adjusted accordingly. In one embodiment, the score of a candidate manifest may "fade" based on how long ago it was last used as a champion.

In yet another embodiment, the score of a candidate manifest may be adjusted based on how useful it was when it was selected as a champion in processing a given input data segment. For example, a champion manifest may be chosen but it may contain no references to specimen data chunks which correspond to other input data chunks of the input data segment being processed. In other words, although it was chosen as a champion, it did not help in the de-duplication of the data contained in the input data segment.

If, however, when a candidate manifest was chosen as a champion manifest, it was particularly useful in processing that input data segment, a higher score may be attributed to that candidate manifest when processing the present input data segment.

Method E

As described above, in processing a segment of input data, data processing apparatus embodying the present invention is operable to identify manifests having at least one reference to one of said specimen data chunks that corresponds to one of said input data chunks of the segment of input data; and on which there is information contained in the sparse chunk index.

Thus, in this embodiment, only those input data chunks of the input data segment being processed and having the predetermined characteristic are used to locate manifests. In the embodiments described above, manifests identified in processing the previous input data segments are added to the candidate list.

In a further embodiment, the data processing apparatus is operable to identify manifests having at least one reference to specimen data chunks that correspond to one of a predetermined range of input data chunks and on which there is information contained in the sparse chunk index.

In this embodiment, the predetermined range of input data chunks may comprise all of the input data chunks of the input data segment being processed. In addition, the range of input data chunks may comprise at least one input data chunk contained in another input data segment.

Thus, with regard to FIG. 4, when processing input data segment 13, in addition to identifying manifests having at least one reference to one of said specimen data chunks that corresponds to one of the look-up chunks (M and P), the data processing apparatus may additionally attempt to identify manifests having at least one reference to one of said specimen data chunks that corresponds to at least one of the input data chunks of input data segment 11, i.e. the input data segment immediately preceding the current data segment.

In one embodiment, the "other" input data segment may be the immediately preceding input data segment.

In one embodiment, the input data chunks used from the previous input data segment may be the last N input data chunks of the previous input data segment or they may be picked at random.

In one embodiment, the input data chunks contained in the last 50% of the preceding input data segment may be used. In another embodiment, the final 25% of input data chunks of the chosen input data segments may be used.

The input data chunks used from the other input data segments are used only to identify manifests and those input data segments are not compared with the returned manifests. This is because those input data chunks may not be present in the actual input data segment being processed. It will also be appreciated that only the input data chunks from the other input data segments that have the predetermined characteristic will be of use.

With reference to FIG. 5, suppose for this example that as well as identifying manifests having at least one reference to one of said specimen data chunks that corresponds to one of said input data chunks 12 of input data segment 13, the data processing apparatus also seeks to identify manifests having at least one reference to one of said specimen data chunks that corresponds to the last four input data chunks of input data segment 11 and on which there is information contained in the sparse chunk index.

In this example, it will be seen that input data chunks B and D from input data segment 11 have the predetermined characteristic. As a result, both manifests already stored in the manifest store will be returned as candidate manifests. In the subsequent processing of the candidate manifests, it is likely that the manifest corresponding to input data segment 1 will be chosen as a champion, depending on its position in the candidate list. If so, in processing that returned manifest, it will be found that the manifest comprises references to the specimen data chunks corresponding to specimen data chunks E, F, G, H and A of input data segment 13.

As a result of such processing, it will be found that there are specimen data chunks already existing in the chunk store corresponding to eight of the nine input data chunks 12 of input data segment 13.

Although in the above-described example four of the input data chunks 12 of input data segment 11 were used, fewer input data chunks may be used and benefits of the present invention will still be experienced.

For example, in one embodiment, the data processing apparatus may seek to identify manifests having at least one reference to one of said specimen data chunks that corresponds to the final input data chunk of the preceding input data segment and on which there is information contained in the sparse chunk index.

With the example shown in FIG. 4, this would mean that the data processing apparatus seeks to identify manifests having a reference to specimen data chunk D. Because specimen data chunk D has the predetermined reference, this will identify the other manifests in the manifest store.

When manifests are stored to disk, they may be grouped into consecutive lists called "gangs". For example, the manifests of segments 1, 2 and 3 might be stored in gang 1; and the manifests of segments 4, 5 and 6 might be gang 2, and so on. In one embodiment, the size of a gang is co-terminus with the maximum extent of data that a read/write head may read in a single operation. Thus, reading all of the manifests of an entire gang will take the same or similar time as reading a single manifest in that gang. Thus, it may be beneficial to read the entire gang containing a manifest of interest into RAM. After so doing, some or all of the manifests may be inserted into the manifest cache.

One embodiment of the present invention provides data processing apparatus comprising: a chunk store containing specimen data chunks, a manifest store containing a plurality of manifests, each of which represents at least a part of previously processed data and comprises at least one reference to at least one of said specimen data chunks, a sparse chunk index containing information on only some specimen data chunks, the processing apparatus being operable to: process input data into a plurality of input data segments, each composed of input data chunks; identify manifests having references to specimen data chunks which correspond to input data chunks of a first input data segment and on which wherein the sparse chunk index contains information; retrieve manifests having references to specimen data chunks which correspond to at least one input data chunk of previously processed data, use the identified and retrieved manifests to identify specimen data chunks corresponding to other input data chunks of the first input data segment.

Another embodiment of the present invention provides a data processor, operable to: process input data into input data chunks, the input data chunks being arranged into input data segments; select at least some of the input data chunks having a predetermined characteristic, compile a list of candidate manifests from a manifest store, the list comprising: at least one manifest having a reference to a specimen data chunk corresponding to at least one of the selected input data chunks; and at least one manifest identified in processing at least one other segment of input data; and prioritise and process the candidate manifests to identify specimen data chunks corresponding to other input data chunks of the segment being processed.

Another embodiment of the present invention provides a data processing apparatus comprising: a chunk store containing specimen data chunks, a manifest store containing a plurality of manifests, each of which represents at least a part of previously processed data and comprises at least one reference to at least one of said specimen data chunks, a sparse chunk index containing information on only some specimen data chunks, the processing apparatus being operable to: for a first input data segment, identify manifests having at least one reference to one of said specimen data chunks that corresponds to one of the input data chunks of the first input data segment, and on which there is information contained in the sparse chunk index;
use at least one of said identified manifests in processing a second input data segment, to identify specimen data chunks corresponding to input data chunks of the second input data segment.

Figure 6:
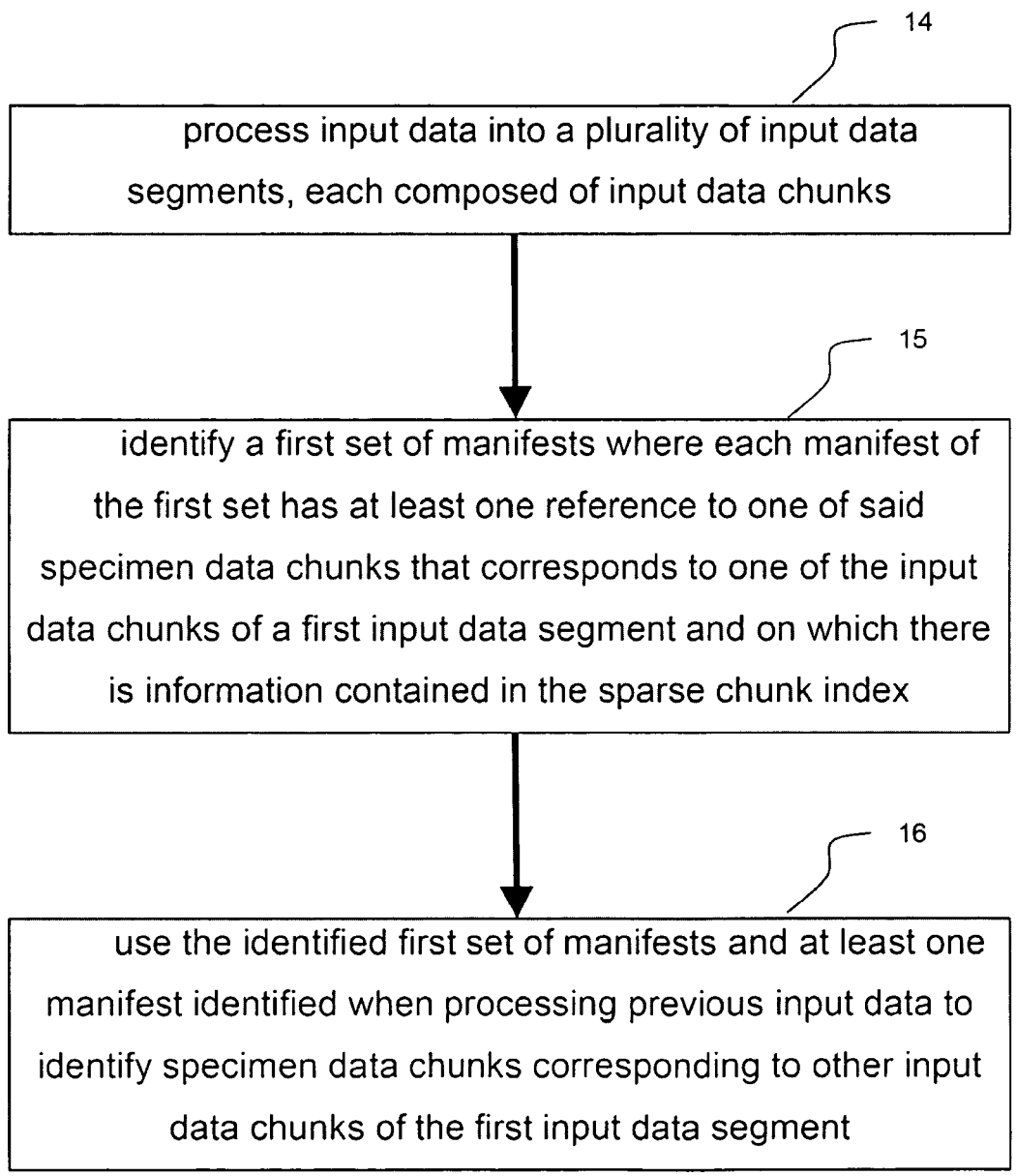
FIG. 6 shows a flow chart of a method embodying the present invention.

With reference to FIG. 6, the present invention provides a method of processing data, using:
  a chunk store containing specimen data chunks,
  a manifest store containing a plurality of manifests, each of which represents at least a part of previously processed data and comprises at least one reference to at least one of said specimen data chunks; and
  a sparse chunk index containing information on only some specimen data chunks,
  the method comprising:
    processing 14 input data into a plurality of input data segments, each composed of input data chunks;
    identifying 15 a first set of manifests, where each manifest of the first set has at least one reference to one of said specimen data chunks that corresponds to one of the input data chunks of a first input data segment and on which there is information contained in the sparse chunk index; and
    using 16 the identified first set of manifests and at least one manifest identified when processing previous data to identify specimen data chunks corresponding to other input data chunks of the first input data segment.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A data processing apparatus comprising:
  a chunk store configured for containing specimen data chunks,
  a manifest store configured for containing a plurality of manifests, each of which represents at least a part of previously processed data and comprises at least one reference to at least one of said specimen data chunks,
  a sparse chunk index containing information on only a subset less than all of the specimen data chunks in the chunk store, wherein information contained in the sparse chunk index for a given one of the specimen data chunks includes references to manifests that include a reference to the given specimen data chunk,
  at least one processor to:
    process input data into a plurality of input data segments, each composed of input data chunks;
    identify a first set of manifests, where each manifest of the first set has at least one reference to one of said specimen data chunks that corresponds to one of the input data chunks of a first input data segment, and on which there is information contained in the sparse chunk index; and identify specimen data chunks corresponding to other input data chunks of the first input data segment by using the identified first set of manifests and at least one manifest identified when processing previous data.

2. The data processing apparatus according to claim 1, wherein the sparse chunk index contains information on specimen data chunks having a predetermined characteristic.

3. The data processing apparatus according claim 1, wherein the at least one processor is to compare the input data chunks of the first input data segment with the specimen data chunks referenced by the identified first set of manifests and the at least one manifest identified when processing previous data, to identify specimen data chunks corresponding to input data chunks of the first input data segment.

4. The data processing apparatus according to claim 1, further comprising a cache to store at least one of said first set of identified manifests.

5. The data processing apparatus according to claim 1, wherein the at least one processor is to prioritize, based on at least one prioritization criterion, the manifests of said identified first set of manifests and said at least one manifest identified when processing previous data, wherein the at least one prioritization criterion is based at least in part on a number of references each manifest contains to specimen data chunks corresponding to input data chunks of the first input data segment and on which there is information contained in the sparse chunk index.

6. The data processing apparatus according to claim 1, wherein the at least one processor is to prioritize, based on at least one prioritization criterion, the manifests of said identified first set of manifests and said at least one manifest identified when processing previous data, wherein the at least one prioritization criterion is based at least in part on a prioritization of the at least one manifest when processing the previous data.

7. The data processing apparatus according to claim 1, wherein the at least one processor is to prioritize, based on at least one prioritization criterion, the manifests of said identified first set of manifests and said at least one manifest identified when processing previous data, wherein the at least one prioritization criterion is based at least in part on when each manifest was added to the manifest store.

8. The data processing apparatus according to claim 1, wherein the at least one processor is to prioritize, based on at least one prioritization criterion, the manifests of said identified first set of manifests and said at least one manifest identified when processing previous data, wherein the at least one prioritization criterion is based at least in part on whether each manifest is currently held in a cache.

9. The data processing apparatus according to claim 5, wherein the at least one processor is to select at least one of the prioritized manifests to identify specimen data chunks corresponding to said other input data chunks of the first input data segment.

10. A data processing apparatus comprising:
a chunk store configured for containing specimen data chunks;
a manifest store configured for containing a plurality of manifests, each of which represents at least a part of previously processed data and comprises at least one reference to at least one of said specimen data chunks,
a sparse chunk index containing information on only some specimen data chunks, wherein information contained in the sparse chunk index for a given one of the specimen data chunks includes references to manifests that include a reference to the given specimen data chunk,
at least one processor to:
process input data into a plurality of input data segments, each composed of input data chunks;
identify a first set of manifests, where each manifest of the first set has references to specimen data chunks which correspond to input data chunks of a first input data segment and on which there is information contained in the sparse chunk index;
retrieve manifests having references to specimen data chunks which correspond to at least one input data chunk of previously processed data, and
use the identified and retrieved manifests to identify specimen data chunks corresponding to other input data chunks of the first input data segment.

11. The data processing apparatus according to claim 10, wherein the at least one input data chunk of previously processed data is a predetermined portion of input data chunks of an input data segment of the previously processed data.

12. The data processing apparatus according to claim 11, wherein the input data segment of the previously processed data immediately precedes said first input data segment in the input data.

13. A method of processing data, comprising:
providing a chunk store containing specimen data chunks,
providing a manifest store containing a plurality of manifests, each of which represents at least a part of previously processed data and comprises at least one reference to at least one of said specimen data chunks;
providing a sparse chunk index containing information on a subset less than an entirety of the specimen data chunks in the chunk store, wherein information contained in the sparse chunk index for a given one of the specimen data chunks includes references to manifests that include a reference to the given specimen data chunk;
processing, by at least one processor, input data into a plurality of input data segments, each input data segment composed of input data chunks;
identifying, by the at least one processor, a first set of manifests, where each manifest of the first set has at least one reference to one of said specimen data chunks that corresponds to one of the input data chunks of a first input data segment and on which there is information contained in the sparse chunk index; and
using, by the at least one processor, the identified first set of manifests and at least one manifest identified when processing previous input data to identify specimen data chunks corresponding to other input data chunks of the first input data segment.

14. The method according to claim 13, further comprising:
comparing the other input data chunks of the first input data segment with the specimen data chunks referenced by the identified first set of manifests.

15. The data processing apparatus according to claim 3, wherein the comparing comprises comparing chunk identifiers of the input data chunks to chunk identifiers of the specimen data chunks referenced by the identified first set of manifests and the at least one manifest identified when processing previous data.

16. The data processing apparatus according to claim 10, wherein the identifying of the specimen data chunks using the identified and retrieved manifests comprise comparing the other input data chunks to specimen data chunks referenced by the identified and retrieved manifests.

17. The data processing apparatus according to claim 16, wherein the comparing comprises comparing chunk identifiers of the other input data chunks to chunk identifiers of the specimen data chunks referenced by the identified and retrieved manifests.

18. The method according to claim 14, wherein the comparing comprises comparing chunk identifiers of the input data chunks to chunk identifiers of the specimen data chunks referenced by the identified first set of manifests.

19. The data processing apparatus according to claim 1, wherein one of said specimen data chunks corresponds to one of the input data chunks if the one of said specimen data chunks contains a same content as the one of the input data chunks.

20. The method according to claim 13, wherein one of said specimen data chunks corresponds to one of the input data chunks if the one of said specimen data chunks contains a same content as the one of the input data chunks.

\* \* \* \* \*